United States Patent [19]
Manome

[11] Patent Number: 5,310,427
[45] Date of Patent: May 10, 1994

[54] METHOD FOR TRANSPORTING LIVE FISH
[75] Inventor: Hiromichi Manome, Chiba, Japan
[73] Assignee: Japan Airlines Co., Ltd., Tokyo, Japan
[21] Appl. No.: 856,168
[22] PCT Filed: Aug. 2, 1991
[86] PCT No.: PCT/JP91/01035
§ 371 Date: Apr. 2, 1992
§ 102(e) Date: Apr. 2, 1992
[87] PCT Pub. No.: WO92/02130
PCT Pub. Date: Feb. 20, 1992
[30] Foreign Application Priority Data
Aug. 3, 1990 [JP] Japan .................. 2-205122
[51] Int. Cl.$^5$ .............................. A01K 61/00
[52] U.S. Cl. ..................................... 119/201
[58] Field of Search ...................... 119/3, 4, 5
[56] References Cited
FOREIGN PATENT DOCUMENTS

| | | |
|---|---|---|
| 52-24900 | 2/1977 | Japan . |
| 54-35100 | 3/1979 | Japan . |
| 55-168174 | 12/1980 | Japan . |
| 61-46 | 1/1986 | Japan . |
| 62-138126 | 6/1987 | Japan . |
| 1-144916 | 6/1989 | Japan . |
| 1-182272 | 7/1989 | Japan . |
| 2-150225 | 6/1990 | Japan . |
| 2-245130 | 9/1990 | Japan . |

OTHER PUBLICATIONS

Supplementary European Search Report, EEP 91 91 3664.

Primary Examiner—Gene Mancene
Assistant Examiner—Thomas Price
Attorney, Agent, or Firm—Beveridge, DeGrandi, Weilacher & Young

[57] ABSTRACT

A method for transporting live fish comprising the steps of cooling live fish placed in water to bring the fish into a dormant state, and transporting the live fish in a dormant state with an ambient temperature thereof maintained at −1° to 10° C. This method may further comprise the step of removing the water after the step of cooling live fish.

By the method of the present invention, live fish can be successfully transported even when the transportation takes many hours. Moreover, transportation can be made at low cost.

15 Claims, 2 Drawing Sheets

METHOD FOR TRANSPORTING LIVE FISH

FIELD OF THE INVENTION

The present invention relates to a method for transporting live fish. More particularly, the present invention relates to a method for transporting live fish, in which live fish are brought into a dormant state in order that they can be successfully transported even when the transportation takes many hours and that the transportation can be made at low cost, and a container for use in the method.

BACKGROUND OF THE INVENTION

Storage or transportation of fresh fish and shellfish has been made by packing them in a container with crushed ice or salt ice without freezing them. It is however impossible to resuscitate the fish and shellfish thus stored or transported. For this reason, transportation of fish and shellfish, and in particular, that of fish is recently made by placing them in water to keep them alive.

However, in the above method, live fish swim about in a small container or are shaken during the transportation, and so tend to be damaged. In addition, it is necessary to transport a large quantity of water together with fish. This method is therefore also disadvantageous in the transportation cost. To reduce the transportation cost, an increased number of live fish were placed in one container. However, after the fish were transported in this manner, they were found to be more considerably damaged.

SUMMARY OF THE INVENTION

The inventor of the present invention made studies in order to obtain a method for transporting live fish, capable of keeping fish alive for a long transportation time. As a result, it was found that live fish which have been transported in a dormant state can be resuscitated after the transportation. The present invention has been accomplished on the basis of the above finding.

Accordingly, an object of the present invention is to provide a method for transporting live fish, capable of transporting live fish even when the transportation takes many hours.

A further object of the present invention is to provide a method for transporting live fish, capable of transporting live fish without using water even when the transportation takes many hours.

A still further object of the present invention is to provide a container for use in the above methods for transporting live fish.

The method for transporting live fish according to the present invention comprises the steps of cooling the live fish placed in water to bring the fish into a dormant state, and transporting the live fish in the dormant state placed under the ambient temperature thereof maintained at $-1°$ to $10°$ C.

The container apparatus for transporting live fish comprises a vessel made of heat insulating material, a panel mounted on an inner surface of the vessel for heating a content in the vessel, a lid made of heat insulating material and used to close the vessel, one or more wire cages capable of containing live fish, the cage or cages being placed or stacked in the vessel, and means for admitting or discharging a cooling medium into and out of the vessel.

DETAILED DESCRIPTION OF THE INVENTION

Figure 1:
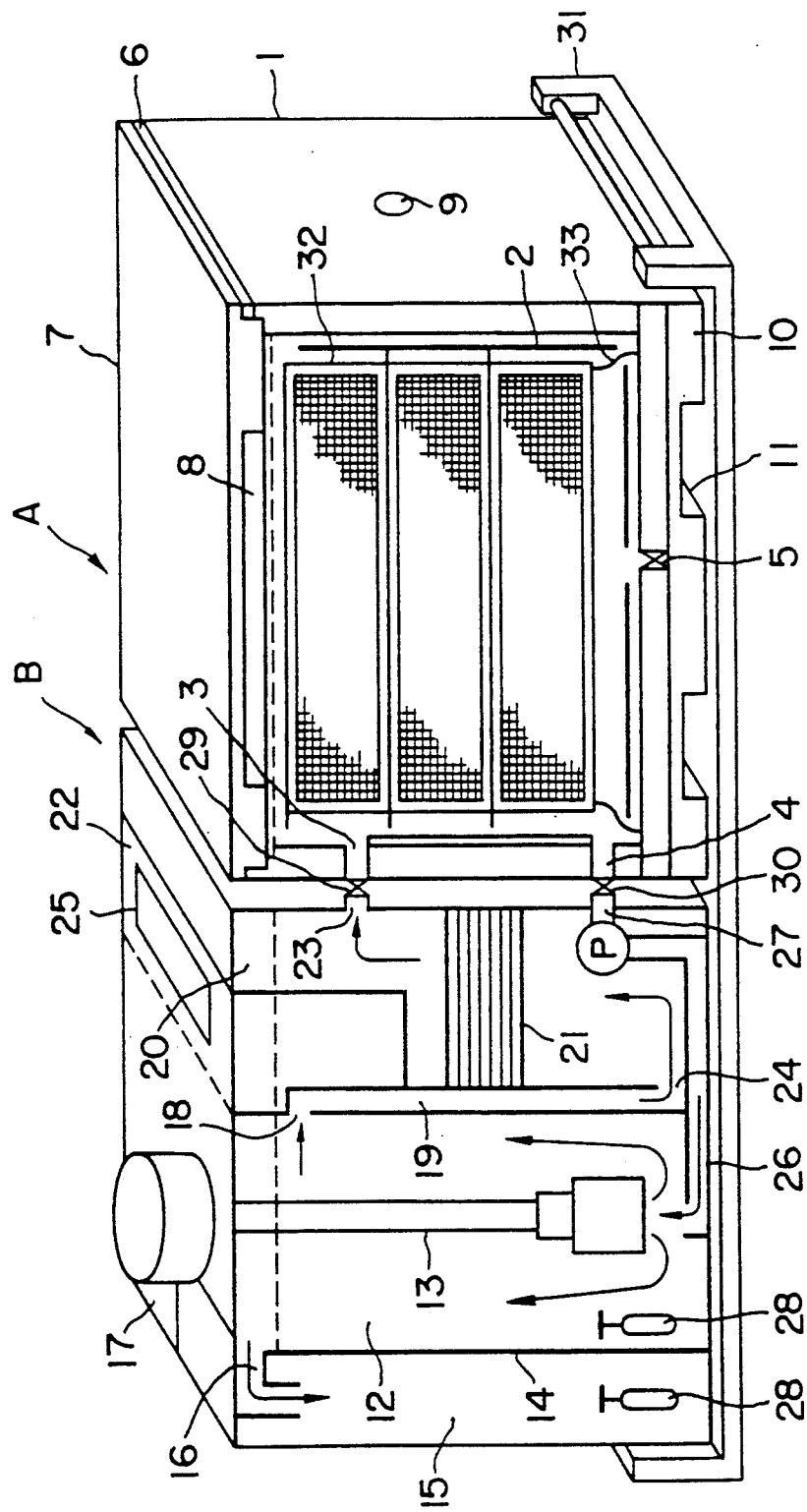
FIG. 1 is a perspective view showing a container utilized in the method of this invention and FIG. 2 is an upper view of the container.

As used herein, the term "fish" is intended to refer not only to fish taxonomically classified but also to so-called "fishery products", and includes, for instance, saltwater fish, freshwater fish, Crustacea, shellfish and Reptilia.

In the method for transporting live fish according to the present invention, live fish are first placed in water and then cooled, whereby the fish are brought into a dormant state. In the present invention, live fish in a dormant state are directed to live fish in such a state that the fish are inactivated by a cooling treatment but can be resuscitated, that is, through anabiosis, when warmed even after the fish are preserved at a temperature of $-1°$ to $10°$ C.

It is preferable to gradually cool the live fish placed in water so that the fish will not be frozen to death. The cooling rate is preferably from $1°$ C./hour to $2°$ C./hour. The cooling of the live fish can be carried out by, for instance, circulating water which has been cooled by a proper means. To protect the fish from stress and from being frozen, it is preferable to cool the fish with irradiation of far infrared rays. Furthermore, it is also preferable to supply air (oxygen) into the water by, for instance, exposing the water to air while the fish are cooled.

The cooling of the live fish is terminated when dormancy of the fish is confirmed.

The live fish thus brought into the dormant state are transported with the ambient temperature thereof maintained at $-1°$ to $10°$ C. As long as the ambient temperature is in the above range, the fish are kept in the dormant state. It is therefore possible to transport the fish without damaging or killing them, and to resuscitate the fish after transportation. When the ambient temperature exceeds $10°$ C., the fish are activated and begin to struggle. As a result, the fish are damaged or cannot survive for a long time any more. On the other hand, when the ambient temperature is lower than $-1°$ C., there is a possibility that the body temperature of the fish also drop below $-0.7°$ C. or $-0.8°$ C. Fish once cooled to such a low temperature cannot be easily resuscitated.

To maintain the ambient temperature at $-1°$ to $10°$ C., the temperature of water in which the fish are placed is controlled within this range. It was unexpectedly found that even when the fish in the dormant state are placed in the air of $-1°$ to $10°$ C. after the water surrounding the fish is removed or the fish are pulled out from the water, the fish are kept in a dormant state and can be readily transported. A method in which water is removed and only fish in the dormant state are transported is advantageous from the viewpoint of the transportation cost because it can decrease the weight of the load. This method is particularly suitable for air transportation.

There is no limitation for the duration of the transportation as long as the fish are substantially in the dormant state. However, a feasible transportation time is, in general, approximately 20 hours at the longest, although this varies depending on the kind of fish and also on the temperature of the atmosphere in which the fish are placed during the transportation.

After transportation, the live fish in the dormant state can be resuscitated. The resuscitation of the fish can be easily conducted by, for instance, warming the water in which the fish are placed. Instead of warming the water or while warming the water, it is also preferable to irradiate far infrared rays to the fish. In the case where the fish have been transported without being placed in water, water (freshwater or saltwater) with a temperature almost the same as the temperature of the atmosphere in which the fish have been placed during the transportation is preferably poured onto the fish, and the water then warmed. In this case, it is also preferable to irradiate far infrared rays to the fish instead of warming the water or while warming the water.

All kinds of fishes can be transported by the transportation method of the present invention. In the case of air transportation, the method of the present invention is particularly suitable for transporting of crucian carp, carp, eels, flatfish, *Fugu rubripes rubripes*, echinoids, lobsters, crabs and the like.

A container utilized in this invention will be described with reference to FIGS. 1 and 2.

Figure 2:
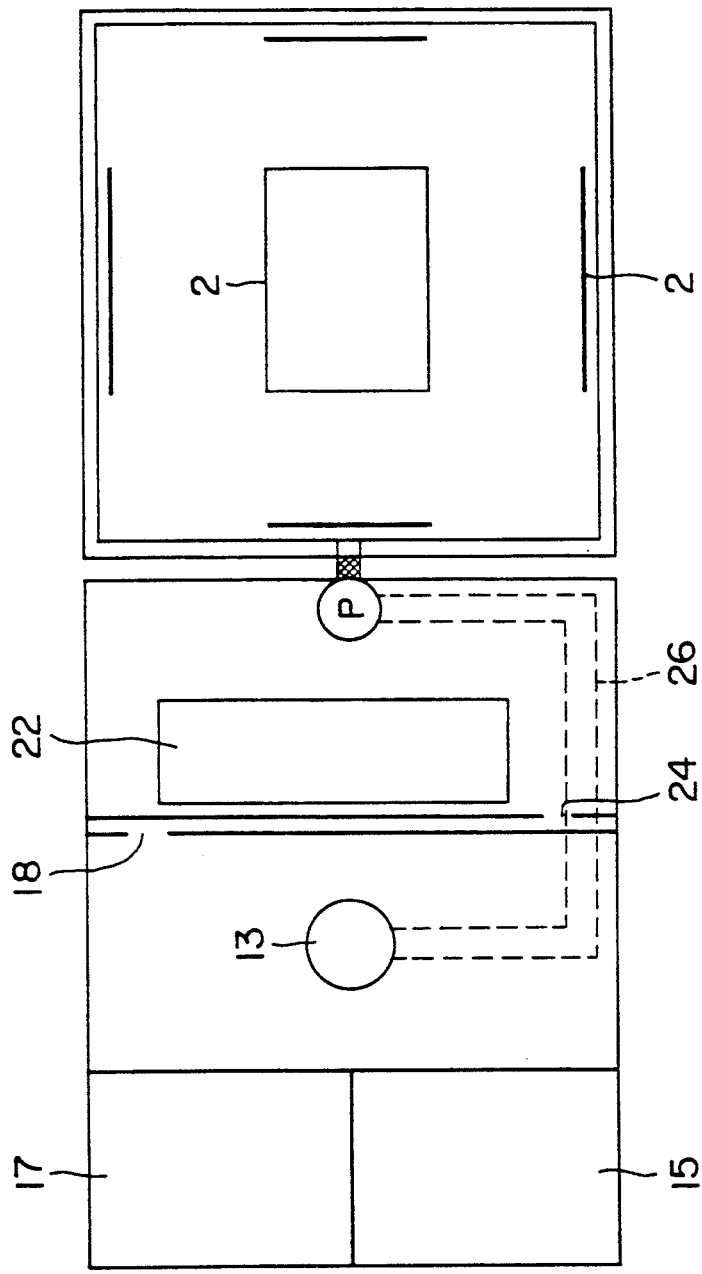

In FIG. 1, the transporting container body is designated by A, and a cooling unit removably mounted on the container body is designated by B. A transporting container A has a vessel (water tank) which comprises a heat insulating sheet made of a heat polyurethane foam sandwiched between glass fiber reinforces plastic sheets. As shown in FIGS. 1 and 2, infrared ray generating panels 2 are mounted on the inner peripheral wall of the water tank for heating the inside of the water tank. The water tank 1 has a water inlet port 3 removably communicated with a water feed port 23 of the cooling unit B formed at the upper portion of the lefthand side wall through a connecting member 29, water outlet port 4 removably communicated with a pump suction port 27 of the cooling unit formed at the lower portion of the lefthand side wall through a connecting member 30, and a water discharge opening which can be opened and closed and provided at the bottom for discharging the water in the water tank when the container is transported without water. The top of the water tank is covered with a lid 7 made of similar heat insulating material to that of the water tank. A container 8 for accommodating a cold storage agent is installed in the lid 7. The cold storage accommodating container 8 is used to accommodate such a cooling agent as dry ice; a mixture of ice and salt; and iced water-absorb polymer containing water. The cold storage agent can be substituted by a suitable cooling means, such as an electric refrigerator. The inside wall of the water tank 1 has a thermometer 9 for detecting a temperature of the inside of the water tank. A carriage 10 having grooves for engaging a fork-lift at its lower surface is secured to the outer surface of the bottom of the water tank 1.

The cooling unit B comprises an aerating chamber 12 containing therein an aerating device 13, and an air bubble removing chamber 15 communicated with aerating chamber 12 through a baffle wall 14 having a bubble port 16 at its upper portion. A generator chamber 17 containing an electric generator for supplying electric current to an air pump and a cooling machine. A communicating port 18 formed at the upper portion of the baffle wall which partitions the aeration chamber 12 and a cooling and purifying chamber 20, the communication port 18 being opened at a position lower than the air bubble port 16, the communication port 18 communicating with the port 24 of the cooling and purifying chamber 12 through a passage 19. The passage 19 is constituted by a first baffle wall having the communication port 18 at its upper end and a second baffle wall in parallel with the first baffle wall and having a communicating port 24 at its lower end.

The upper chamber and the lower chamber of the cooling and purifying chamber 20 are communicated through a filtering chamber 21, and the upper chamber has the cooling chamber 22 at its upper portion and a water feed port 23 which can be opened and closed. At the lower portion of one side of the chamber 21 is formed a passage 24 communicated with the port 18 via the passage 19, whereas the other side lower portion of the chamber is provided a circulating pump P having a discharge side communicated with the lower portion of the aerating device 13 through a pipe 26.

The filtering chamber 21 is filled with material which adsorbs and filters such substances and contaminants which are harmful to live fish as sand, activated carbon, coral, granules of ceramics, acryl fibers, and the like.

A substance or device which cools water is contained in the cooling chamber 22, for example, a cooling medium as dry ice, a mixture of ice and salt, or an electric refrigerating machine.

The feed water port 23 which can be opened and closed and through which the cooled water is provided, is removably connected to feed water port 3 of the water tank 1 contained in the transporting container A through a connecting member 29. The passage 24 passes aerated water from the aerating chamber 12 to the bottom of the cooling purifying chamber 20 through the passage 19. The lid of cooling chamber 22 can be provided with a suitable number of small vent holes.

Drain cocks 28 for draining water are provided for the air bubble removing chamber 15 and aerating chamber 12, respectively. There are also provided a carriage 31 for supporting the transporting container A and cooling unit B connected thereto. Net cages, if desired, are superposed one upon the other in the water tank 1 of the transporting container A, and a supporting frame 33 supports superposed wire cages.

The water tank can be made of a strong and light material having heat insulating property instead of the heat insulating plate described above.

A method for transporting live fish using the device described above will be described as below.

Aircraft Transportation

At first, the water inlet port 3 of the water tank 1 in the transporting container A and the port 23 are communicated with each other by a connecting member 29. In the same manner, the water discharge port 4 of water tank 1 and the water feed port 27 of the cooling unit B are also communicated with each other by a connecting member 30. The water tank 1 is filled with sea water. 20 of wire cages each having a depth of 5 cm and containing 100 flatfish are stacked. After adjusting the water level to that shown by dotted lines (see FIG. 1). The generator of the cooling unit B is started to operate the circulating pump P and the aerating device 13. Then the sea water in the water tank 1 was sent to the lower portion of the aerating chamber 12 through the water discharge port 4 and pipe 26, and the sea water was aerated. Air bubbles formed as the result of the aeration are caused to enter into the air bubble removing chamber 15 through the air bubble passage 16. On the other hand, sea water supplemented with oxygen is admitted into the lower section of the cooling and purifying chamber 20 through the upper communicating port 18, the passage 19 and the lower communicating port 24, and the level of the sea water rises. While rising, the sea water flows through the purifying and filtering chamber 21 to be removed with harmuul substances and then flows into the upper chamber and cooled with the cooling chamber 22 containing dry ice. Then the sea water thus purified is sent to the water tank 1 through the feed water port 23 and the water inlet port 3.

The cooling treatment described above was conducted at a rate of 1° to 2° C. per hour. When a temperature of the sea water was 5° C., the flatfish were brought into a dormant state. The cooling treatment was then stopped. The water feeding port, the water receiving port and the water discharging port were closed, and the connecting members were disengaged to separate the cooling unit B. Then, the cold sea water in the water tank 1 was discharged through the discharge port 5 at the bottom. Immediately thereafter, the heat insulating lid containing a cold storage agent (iced water-absorb polymer containing water sold under trademark, JAL JET ICE) was closed. The transporting container thus separated was disposed in an air transporting container and transported for 30 hours by aircraft.

The temperature of an inside of the water tank 1 was maintained at 10° to −1° C. while being monitored with a temperature sensor. After transportation, the temperature in the inside of the water tank 1 was maintained at substantially the same temperature after subjecting to the cooling treatment, by the heat insulating water tank and the heat insulating lid containing the cold storage agent.

After transportation, sea water at a temperature of about 1° C. was admitted into the water tank 1 and irradiated with far infrared rays, the flatfish which had been in the dormant state were resuscitated and suitable for eating as live fish.

Land Transportation

In the case of land transportation, the transporting container A and the cooling unit B are used as a combined unit. After filling the water tank 1 with sea water, the aerating device and the pump were operated to aerate, purify and cool the sea water contained in the water tank 1. 20 of the wire cages containing 100 of flatfish were put into the sea water. The sea water was cooled and circulated until the flatfish were brought into an inactive state, that is, the dormant state. The transporting container and the cooling unit were loaded on a railway car together with the supporting frame, while the container and the cooling unit were connected. During transportation, the sea water was maintained at a temperature of 5° C. by cooling.

After transportation, the pump and aeration device were stopped and then irradiated with far infrared rays, upon which the flatfish swam actively.

Transportation Using Fresh Water

After filling the water tank 1 with fresh water, 20 of the carp were put into the fresh water. While blowing air into the water and irradiating far infrared rays, the carp were brought into the dormant state by slowly cooling with cold water. When the carp became dormant, the blowing air and the cooling treatment was stopped. After discharging the water, a heat insulating lid containing a cold storing agent was closed. The temperature in the water tank after the cooling treatment was 6° C. obtained by the temperature sensor.

The temperature in the water tank applied with the lid was always maintained at a temperature of about 6° C. After transportation, fresh water was admitted into the water tank and this tank was used as a fresh preserve. Then carp were resuscitated and began to swim.

Land transportation can also be made by using trucks instead of railway cars.

Although in the foregoing embodiment stacked wire cages were used, a single wire cage is sufficient in certain cases.

According to the method of transporting live fish according to the invention, since live fish brought into a dormant state by gradual cooling are transported at low temperature of −1° to 10° C., not only is the transportation made more stably but also the live fish can be readily resuscitated after transportation.

Furthermore, according to the transporting container of this invention, it is possible to gradually cool the live fish by supplementing oxygen into the heat insulating water tank containing live fish and by circulating purified cold water, thus enabling the live fish to be cooled to the dormant state without giving stress to the live fish. With the heat insulating lid, the live fish can be safely transported while maintaining a low temperature in the interior of the water tank. When the live fish in the dormant state are resuscitated, anabiosis of the live fish can readily be made by irradiation of far infrared rays.

When the transporting container of this invention is used, the transportation of live fish in the dormant state and anabiosis thereof can be readily performed.

What is claimed is:

1. A method for transporting live fish, comprising the steps of:
   cooling live fish placed in water to bring the fish into a dormant state,
   removing the water within which the fish are placed, and, after removing the water, transporting the live fish in the dormant state with the live fish placed under an ambient temperature maintained at −1° to 10° C.

2. A method for transporting live fish according to claim 1, wherein the live fish are cooled at a rate of 1° C. per hour to 2° C. per hour.

3. A method for transporting live fish according to claim 1, wherein the live fish are irradiated with far infrared rays during the step of cooling the live fish.

4. A method as recited in claim 1 further comprising resuscitating the live fish after transporting the live fish.

5. A method as recited in claim 1 further comprising aerating the water within which the fish are placed during cooling of the water.

6. A method for transporting live fish, comprising the steps of:
   soaking live fish in water contained in a heat-insulated container.
   gradually cooling the live fish to bring the fish into a dormant state without freezing the fish to death,
   removing the water from the container and thereafter transporting to a destination the live fish in a dormant state with the live fish placed under an ambient temperature maintained at −1° to 10° C., and
   resuscitating the live fish in the dormant state after the fish have arrived at the destination.

7. A method for transporting live fish according to claim 6, further comprising, after the step of cooling the live fish, the step of sealing the container.

8. A method for transporting live fish according to claim 6, wherein the live fish are cooled at a rate of 1° C. per hour to 2° C. per hour.

9. A method for transporting live fish according to claim 6, wherein the live fish are irradiated with far infrared rays during the step of cooling the live fish.

10. A method for transporting live fish, comprising
cooling live fish contained in a body of water to bring the fish into a dormant state;
separating the live fish from contact with water while maintaining said fish dormant; and
transporting the live fish following separation of the live fish from the water;
and maintaining the live fish in a dormant state during transportation by placing the live fish under an ambient temperature maintained at −1° to 10° C.

11. A method as recited in claim 10 wherein said body of water is confined in an insulated container and separation of the fish from the body of water includes draining the water from the container, and wherein transporting the live fish includes transporting the fish in said container after draining.

12. A method as recited in claim 10 further comprising irradiating the fish.

13. A method as recited in claim 10 further comprising cooling the fish while in the body of water at a rate of 1° to 2° C. per hour.

14. A method as recited in claim 10 including sealing the insulated container by adding an insulating cover and maintaining the fish dormant during transportation by providing a cooling member which is contained in the insulating cover.

15. A method as recited in claim 10 further comprising aerating the body of water during cooling of the live fish.

* * * * *